United States Patent [19]
Glogan

[11] Patent Number: 5,862,422
[45] Date of Patent: Jan. 19, 1999

[54] COUNTER EXPOSURE CONTROL

[75] Inventor: David J. Glogan, Rochester, N.Y.

[73] Assignee: Eastman Kodak Company, Rochester, N.Y.

[21] Appl. No.: 966,152

[22] Filed: Nov. 7, 1997

[51] Int. Cl.⁶ .................................................. G03B 17/36
[52] U.S. Cl. ........................................................ 396/284
[58] Field of Search ............................................ 396/284

[56] References Cited

U.S. PATENT DOCUMENTS 4,268,150   5/1981   Chen ...................................... 396/284

*Primary Examiner*—W. B. Perkey
*Attorney, Agent, or Firm*—James D. Leimbach

[57] ABSTRACT

In the low cost APS camera, an exposure counter is originally at count 1 and is covered by a flag which is removed from count 1 when the shutter release button is depressed. When the film is returned to the cartridge and the exposure indicator is parked, the flag covers count max. The counter returns to the initial count position in response to opening the film door. The counter is incremented off the HEL (high energy lever) instead of the film perforations.

24 Claims, 4 Drawing Sheets

COUNTER EXPOSURE CONTROL

FIELD OF THE INVENTION

The invention relates generally to the field of cameras and in particular to exposure counters and associated controls within cameras.

BACKGROUND OF THE INVENTION

There are numerous prior art devices for exposure counter controls within cameras. Among these prior art devices are exposure counter controls that are integrated with the film loading mechanisms of cameras. A typical, and desirable, feature of a exposure counter within a camera design is that the mechanism can differentiate between the condition film being present within the camera and the condition where film is not present within the camera. A further refinement of the film presence feature is that of detecting when a film cartridge has been loaded in the camera but the film still remains within the film cartridge and that condition where the camera has been initialized with the film advanced out of the film cartridge to its first metered position.

In the condition where the film is still within the cartridge, the exposure counter control must not allow the user to attempt to take a picture. This feature is conventionally provided within prior art devices by a mechanism employing a sprocket to sense perforations in the film. There is a shortcoming within the prior art in attempting to provide the features of sensing whether the film has been advanced to its first metered position without the use of a sprocket in the camera exposure counter control. The inclusion of a sprocket within the design of a camera increases size and part count and alternative methods that do not require a sprocket are, therefore, desirable.

From the foregoing discussion it should be apparent that there remains a need within the art of exposure counter controls for camera design that integrates the features of detecting when the film has been loaded and advanced to its first metered position without requiring a sprocket in the design.

SUMMARY OF THE INVENTION

To solve the above discussed problem, the present invention has provided a park lever with an indicator flag that can cover the exposure indicator to alert the user as to the present condition of the film within the camera. The position of the flag can indicate which condition exists. In APS cameras, the part commonly known as the park lever actuates in time with the film cartridge door. The state of the of the film door is an accurate indicator of film cartridge conditions. By attaching a flag to the park lever, and positioning the flag so it is visible through a window over the exposure counter indicator, the user is informed which condition the camera is in.

The present invention is directed to overcoming one or more of the problems set forth above. Briefly summarized, according to one aspect of the present invention, an exposure counter control for a camera comprising: a counter wheel within the camera having a predetermined number of positions arranged such that one of the positions is visually discernible through an opening in an exposure indicator; a first spring biasing the counter wheel; a high energy lever that is operatively coupled to the counter wheel and biased by a second spring; and a trigger mechanism that is coupled to the high energy lever.

These and other aspects, objects, features, and advantages of the present invention will be more clearly understood and appreciated from a review of the following detailed description of the preferred embodiments and appended claims, and by reference to the accompanying drawings.

Advantageous Effect Of The Invention

This mechanism has the advantage of alerting the user to which of the two conditions the camera is in, while eliminating the sprocket. Elimination of the sprocket allows additional freedoms in deciding the overall camera size and part configuration. This mechanism also has the advantage of signaling to the user when the film has been rewound into the cartridge and the cartridge is ready for removal.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
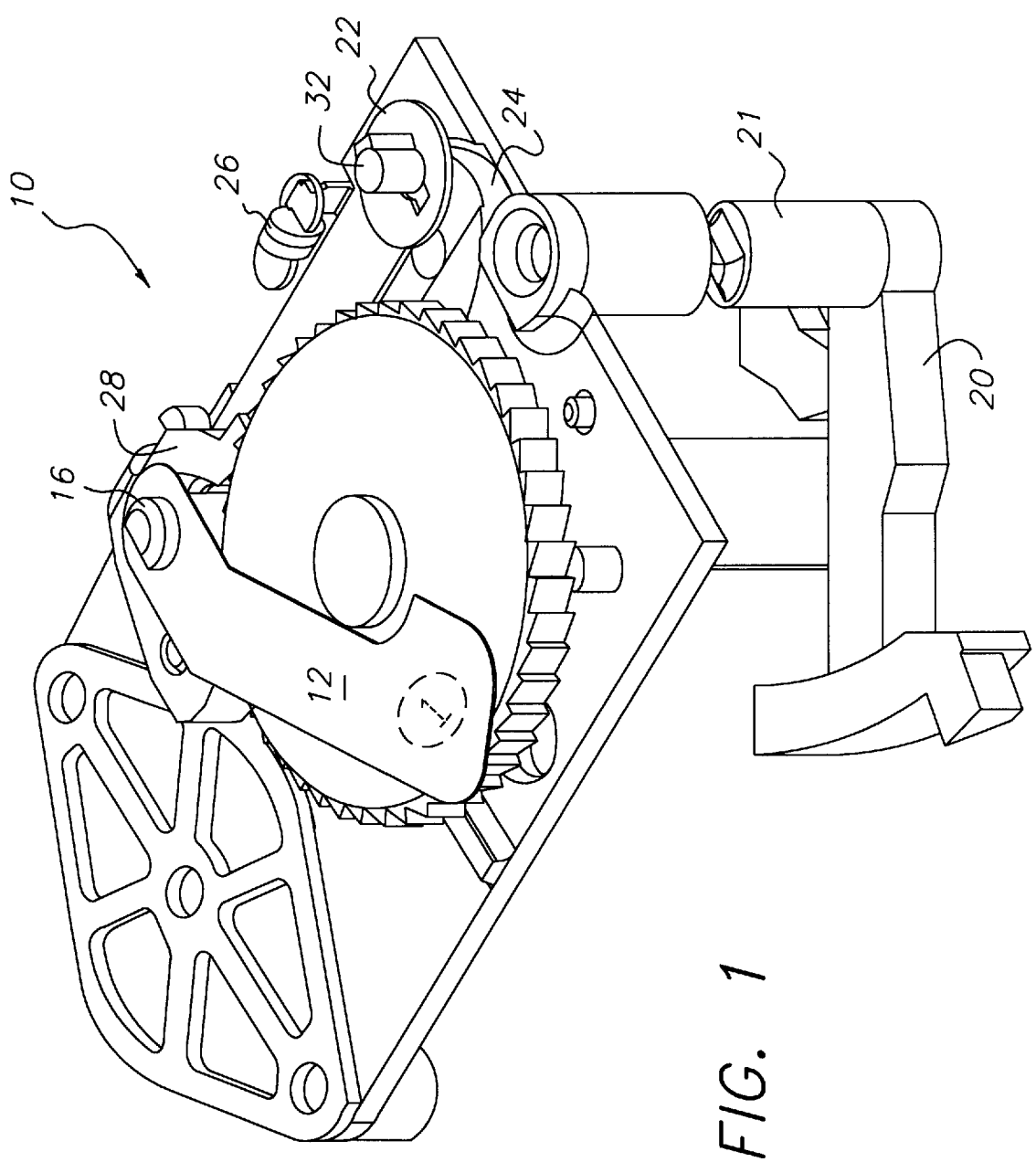
FIG. 1 is a perspective view of the flag obscuring the counter.

Referring to FIG. 1, perspective view of the counter exposure 10 as it exists when: (1) there is no film cartridge in the camera; or (2) the film cartridge is present, but the camera is not yet initialized. The sequence discussed herein, begins with conditions that exist when the film cartridge has been loaded in the camera but the film remains within the cartridge. Here, counter flag 12, obscures the frame counter 112 from view. The flag 12 is attached to a pivot 16 on park lever 18. The park lever 18 is operated in conjunction with the light lock door (not shown) to an Advanced Photo System (APS) camera. The high energy lever 20 is attached to shaft 21 which has a crank portion 24 formed as part of shaft 21. Spring 26 is connected to picker 22 and ratchet 28 to force both the picker 22 and the ratchet 28 to engage with teeth on counter 11.

The "high energy lever" 20 is so named because it is a relatively heavy and used as a powerful spring upon release from its latched position. The potential of the spring like high energy lever 18 is transferred into a relatively high amount of kinetic energy that is typically used to strike the shutter blade and also to actuate metering devices. The energy is "high" relative to the energy contained in other spring driven levers in the camera.

When the film cartridge has been inserted into the camera, but the film is still completely inside the cartridge (not shown), the park lever 18 remains stationary. The flag 12 extends beneath the counter window (not shown) and indicates that the camera is in the condition that the film cartridge is in the camera wherein the film still remains within the film cartridge. The shutter blade is mechanically coupled to the high energy lever by a latch. The shutter button is electrically coupled to the motor by a switch.

Figure 2:
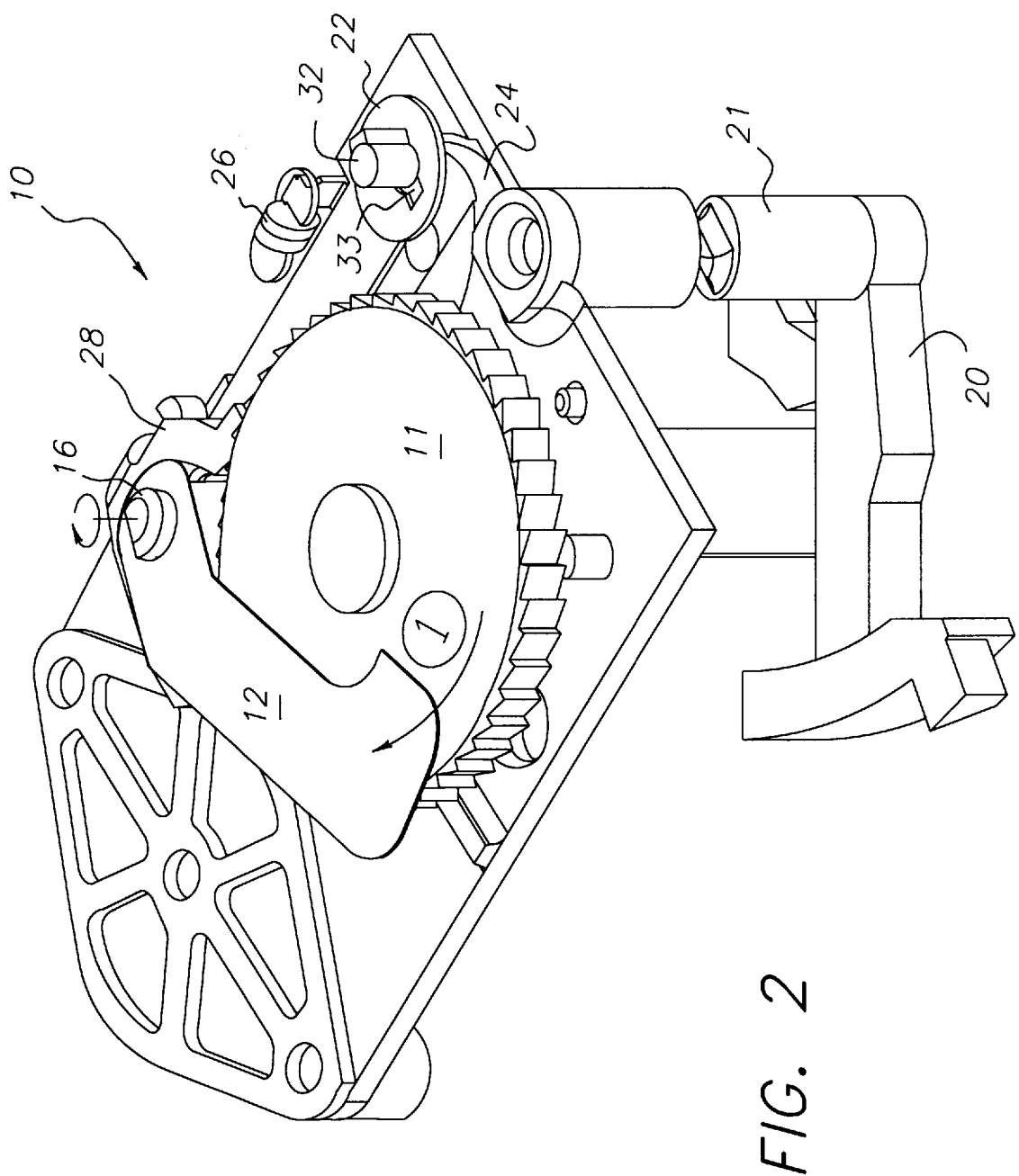
FIG. 2 is a perspective view of the flag rotated to expose the counter.

Referring to FIG. 2, the counter exposure 10 is in a condition where the camera has been initialized and the film (not shown) advances to its first metered position. The camera is initialized by pressing on a trigger (which is typically a shutter button) that begins a sequence which winds film. The film winding initiates movement within the park lever 18 and the flag 12 is turned around by pivot 16 on the park lever 18 exposing the first counter position, wherein the preferred embodiment is "1". The flag 12 rotates with the park lever 18 until the camera reaches the condition as shown in FIG. 2, and the flag 12 is no longer visible through the counter window (not shown). An alternate method is to leave the flag visible in both conditions and have the counter wheel 11 marked accordingly. After the counter 11 is in its initial condition, a pressing of the shutter button releases the high energy lever 20, which in turn causes the picker 22 to advance one tooth on the counter wheel 11. The counter wheel 11 remains held in place by the ratchet 28. Releasing the shutter button initiates movement within the camera motor. This movement by the motor cocks the high energy lever. The high energy lever forces the picker to increment the counter.

The above process is repeated until the end of the film roll is reached, whereupon, the film is rewound. The rewinding of the film causes the park lever 18 to rotate to a parked position. The counter wheel 11 remains at its existing position until the film door is opened, at which point the counter wheel 11 is reset.

Figure 3:
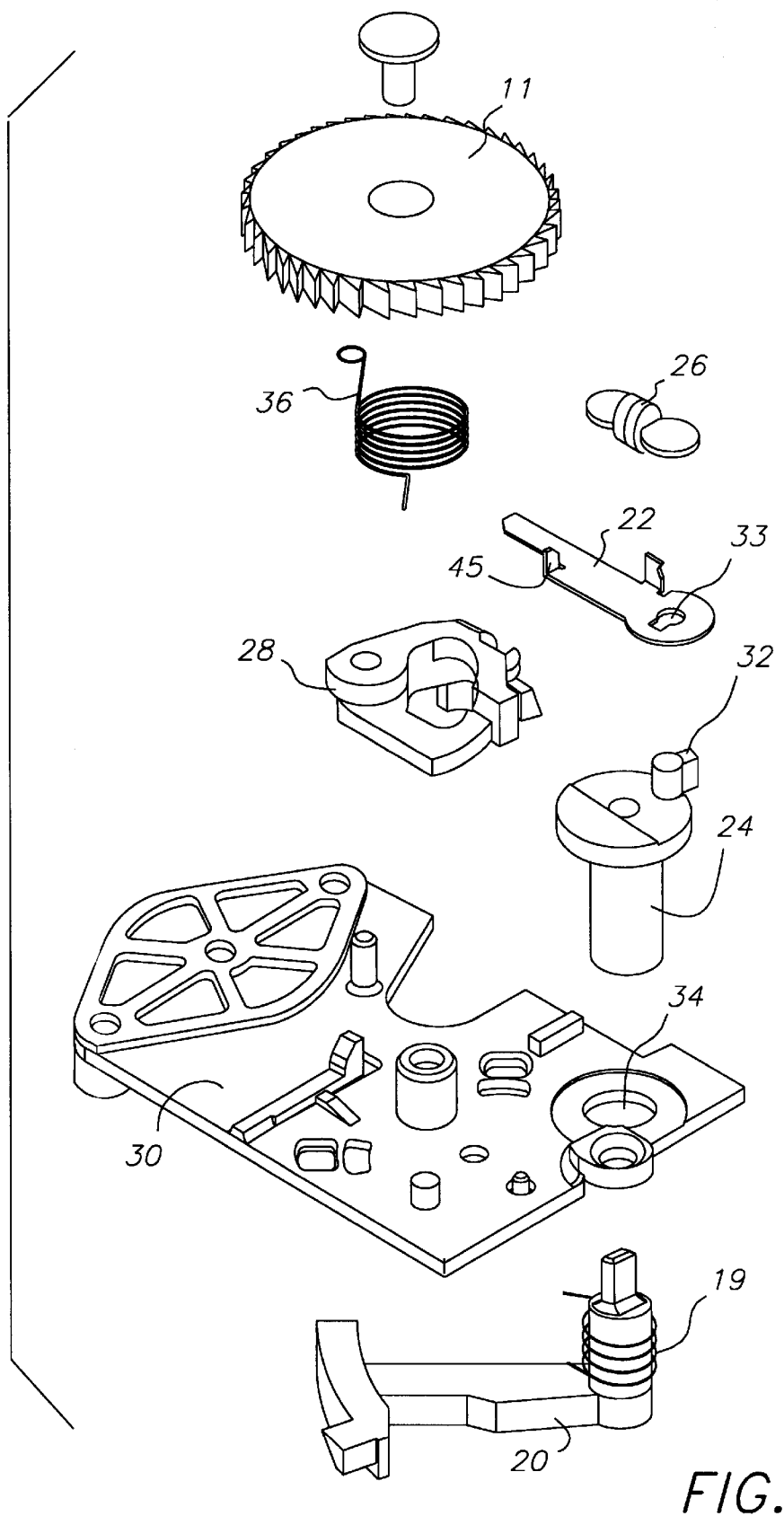
FIG. 3 is an exploded view of the exposure counter control as envisioned by the present invention

FIG. 3 is an exploded view of the invention as envisioned by the preferred embodiment. Plate 30 forms the base to which the various parts of the invention fit. High energy lever 20 fastens to crank 24 through aperture 34 within plate 30. Spring 19 provides a biasing and release force for high energy lever 20. Picker 22 attaches to crank 24 by extension armature 32 on crank 24 passing through aperture 33 within picker 22. Member 45 is formed on picker 22 to engage one of the teeth within counter wheel 11. Counter wheel 11 is biased by torsion spring 36 to enable to incrementing of the counter wheel 11 controlled by ratchet 28 and picker 22. The counter operates in response to the shutter to the camera in conjunction with the camera motor (not shown). By pressing the shutter button, the user releases the high energy lever. The high energy lever 20 is cocked with a releasing of the trigger button-not shown. Picker 22 is coupled to the high energy lever 20 via crank 24 to increment counter wheel 11. The counter wheel 11 is prevented from free turning because of the engagement of ratchet 28. The opening of film door resets counter wheel 11 due to the positioning of park lever 18.

Figure 4A:
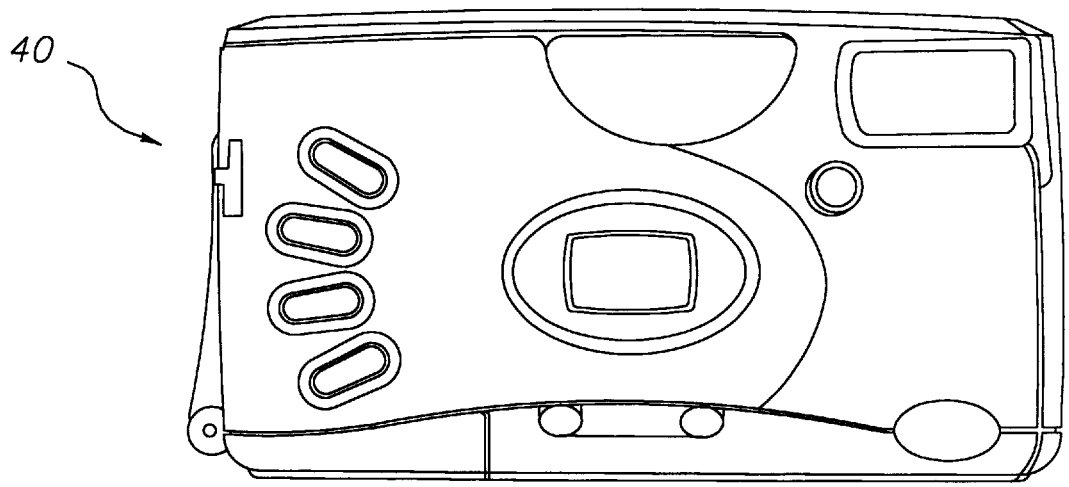
FIG. 4 is a perspective view of a camera envisioned to be used with the present invention.
Figure 4B:
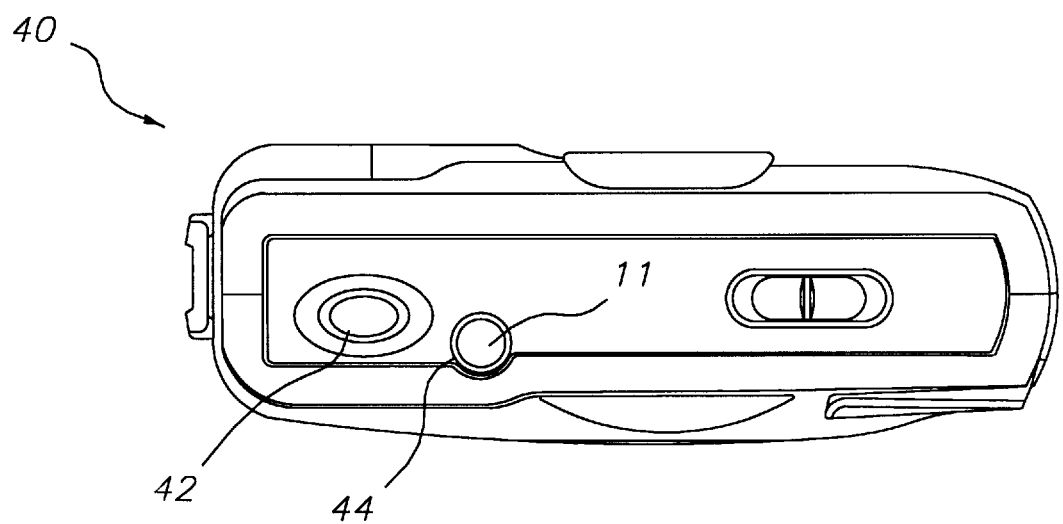

The foregoing embodiment illustrates the invention as envisioned for APS cameras. A typical APS camera 40 envisioned to potentially employ the present invention can be seen referring to FIG. 4A and FIG. 4B where exposure indicator 44 allows counter 11 to be viewed. As shown the camera is initialized with the film at its fist position ready to snap pictures.

While APS cameras represent the preferred embodiment, other embodiments are envisioned, such as 35 mm embodiments. It is specifically envisioned that the invention be used in a 35 mm embodiment where either a film door or a shutter trip be employed to actuate the high energy lever rather than the light lock door as employed by the preferred embodiment.

The inventor has described the embodiments most preferred, however, variations of those embodiments will be obvious to those skilled within the art. Accordingly, the scope of the invention is defined by the appended claims.

| PARTS LIST | |
|---|---|
| 10 | counter exposure |
| 11 | counter |
| 12 | counter flag |
| 14 | frame counter |
| 16 | pivot |
| 18 | park lever |
| 19 | spring |
| 20 | high energy lever |
| 21 | shaft |
| 22 | picker |
| 24 | crank |
| 26 | spring |
| 28 | ratchet |
| 30 | plate |
| 32 | armature |
| 33 | aperture |
| 34 | aperture |
| 36 | torsion |
| 40 | APS camera |
| 42 | shutter button |
| 44 | exposure indicator |
| 45 | member |

What is claimed is:

1. An exposure counter control for a camera comprising:
   a counter wheel within the camera having a predetermined number of positions arranged such that one of the positions is visually discernible through as an exposure indicator;
   a first spring biasing the counter wheel;
   a drive lever that is operatively coupled to the counter wheel and biased by a second spring; and
   a trigger mechanism that is coupled to the drive lever.

2. The exposure counter control of claim 1 further comprising a cover situated over the exposure indicator that is operatively connected to the trigger.

3. The invention of claim 2 further comprises:
   an original counter position that is covered by the cover; and
   a shutter button is the trigger.

4. The invention of claim 1 further comprising:
   a film door; and
   means responsive to opening of the film door for setting the counter in an original position.

5. The invention of claim 4 wherein the means responsive to opening and closing the film door is the drive lever.

6. The invention of claim 1 wherein the counter is operatively connected to the drive lever through a ratchet mechanism.

7. The invention of claim 6 wherein the counter is incremented by the drive lever.

8. The invention of claim 1 wherein the camera is an APS camera.

9. The invention of claim 1 wherein the camera is a 35 mm camera and the means for activating the drive lever is selected from either a film door or a shutter trip.

10. The invention of claim 1 further comprising a motor that operates in conjunction with the trigger mechanism to increment the counter wheel.

11. An exposure counter control for a camera comprising:
    a counter wheel within the camera having a predetermined number of positions arranged such that one of the positions is visually discernible through as an exposure indicator;
    a first spring biasing the counter wheel;
    a high energy lever that is operatively coupled to the counter wheel and biased by a second spring;

a trigger mechanism that is coupled to the high energy lever; and a cover situated over the exposure indicator that is operatively connected to the trigger.

12. The invention of claim 1 further comprising:

a film door; and means responsive to opening of the film door for setting the counter in an original position.

13. The invention of claim 12 wherein the means responsive to opening and closing the film door is the high energy lever.

14. The invention of claim 13 wherein the counter is operatively connected to the high energy lever through a ratchet mechanism.

15. The invention of claim 14 wherein the counter is incremented by the high energy lever.

16. The invention of claim 11 further comprising a motor that operates in conjunction with the trigger mechanism to increment the counter wheel.

17. The invention of claim 11 further comprising cover removal means for removing the cover from covering the exposure indicator.

18. The invention of claim 17 wherein the cover removal means further comprises a lever.

19. The invention of claim 17 wherein the cover removal means further comprises a cam.

20. The invention of claim 17 wherein the cover removal means further comprises a rotating member.

21. The invention of claim 17 wherein the cover removal means further comprises a sliding member.

22. A method of providing an exposure counter indicator for cameras comprising the steps of:

providing a counter wheel within the camera that is biased by a first spring, the counter having a predetermined number of positions arranged such that one of the positions is visually discernible through as an exposure indicator;

operatively coupling a high energy lever to the counter wheel and biasing the high energy lever by a second spring;

coupling a trigger mechanism to the high energy lever; and removably covering the exposure indicator.

23. The method of claim 22 wherein the step of operatively coupling further comprises providing a film to which high energy lever is responsive for incrementing the counter.

24. The method claim 23 wherein the step operatively coupling the high energy lever to the counter further comprises employing a ratchet mechanism.

* * * * *